(12) United States Patent
Kimishima

(10) Patent No.: US 11,358,416 B2
(45) Date of Patent: Jun. 14, 2022

(54) TIRE

(71) Applicant: Sumitomo Rubber Industries, Ltd., Kobe (JP)

(72) Inventor: Takahiro Kimishima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 386 days.

(21) Appl. No.: 15/978,952

(22) Filed: May 14, 2018

(65) Prior Publication Data

US 2018/0339557 A1 Nov. 29, 2018

(30) Foreign Application Priority Data

May 29, 2017 (JP) .............................. JP2017-105841

(51) Int. Cl.
*B60C 11/11* (2006.01)
*B60C 11/03* (2006.01)
*B60C 11/01* (2006.01)
*B60C 11/04* (2006.01)
*B60C 11/12* (2006.01)

(52) U.S. Cl.
CPC .......... *B60C 11/0327* (2013.01); *B60C 11/01* (2013.01); *B60C 11/0306* (2013.01); *B60C 11/04* (2013.01); *B60C 11/11* (2013.01); *B60C 11/1204* (2013.01); *B60C 11/1236* (2013.01); *B60C 2011/036* (2013.01); *B60C 2011/0344* (2013.01); *B60C 2011/0365* (2013.01); *B60C 2011/0372* (2013.01)

(58) Field of Classification Search
CPC . B60C 11/04; B60C 11/0306; B60C 11/1204; B60C 2011/1268; B60C 2011/1227
See application file for complete search history.

(56) References Cited

U.S. PATENT DOCUMENTS

| | | | | |
|---|---|---|---|---|
| 6,382,283 B1* | 5/2002 | Caretta | .................... | B60C 11/12 |
| | | | | 152/209.18 |
| 2003/0019555 A1* | 1/2003 | Nakagawa | .......... | B60C 11/0302 |
| | | | | 152/209.18 |
| 2004/0134579 A1* | 7/2004 | Tanaka | .................... | B60C 11/00 |
| | | | | 152/209.1 |
| 2011/0180190 A1* | 7/2011 | Morita | ................ | B60C 11/0306 |
| | | | | 152/209.18 |
| 2012/0118457 A1* | 5/2012 | Matrascia | ............... | B60C 11/12 |
| | | | | 152/209.18 |
| 2013/0105051 A1* | 5/2013 | Takahashi | ........... | B60C 11/0302 |
| | | | | 152/209.16 |

(Continued)

FOREIGN PATENT DOCUMENTS

| | | | | |
|---|---|---|---|---|
| JP | 332907 | * | 2/1991 | ............. B60C 11/11 |
| JP | 2013119282 A | * | 6/2013 | ............. B60C 11/04 |
| JP | 2016-210226 A | | 12/2016 | |

*Primary Examiner* — Cedrick S Williams

(74) *Attorney, Agent, or Firm* — Birch, Stewart, Kolasch & Birch, LLP

(57) ABSTRACT

A tire includes a tread portion including at least one land region extending in a tire circumferential direction. The land region is provided with a plurality of axial groove portions curved so as to protrude in one direction in the tire circumferential direction in a plan view. The axial groove portions include first axial groove portions and second axial groove portions having different degree of curvature from the first axial groove portions.

20 Claims, 7 Drawing Sheets

(56) References Cited

U.S. PATENT DOCUMENTS

| | | | |
|---|---|---|---|
| 2014/0283967 A1* | 9/2014 | Inoue | B60C 11/0306 |
| | | | 152/209.18 |
| 2015/0352905 A1* | 12/2015 | Tanaka | B60C 11/1272 |
| | | | 152/209.18 |
| 2016/0059638 A1* | 3/2016 | Matsuda | B60C 11/0309 |
| | | | 152/209.25 |
| 2016/0144668 A1* | 5/2016 | Oba | B60C 11/0306 |
| | | | 152/209.25 |
| 2016/0263946 A1* | 9/2016 | Bonn | B60C 11/0332 |

* cited by examiner

TIRE

TECHNICAL FIELD

The present invention relates to a tire having a tread portion provided with a land region extending in a tire circumferential direction.

BACKGROUND ART

Japanese Unexamined Patent Application Publication No. 2016-210226 (Patent Literature 1) has proposed a pneumatic tire having the tread portion provided with a middle land region extending in the tire circumferential direction. In this middle land region, in a plan view of the tread portion, a plurality of middle lateral grooves crossing the land region each in an arc shape are provided.

In the pneumatic tire disclosed in the Patent Literature 1, each of the middle lateral grooves is formed in the same arc shape. Thereby, in the pneumatic tire disclosed in the Patent Literature 1, pitch sound caused by the middle lateral grooves during running is likely to overlap in a specific frequency band, therefore, it is possible that noise performance is deteriorated.

SUMMARY OF THE INVENTION

The present invention was made in view of the above, and a primary object thereof is to provide a tire capable of improving the noise performance.

In one aspect of the present invention, a tire comprises a tread portion comprising at least one land region extending in a tire circumferential direction, wherein the land region is provided with a plurality of axial groove portions curved so as to protrude in one direction in the tire circumferential direction in a plan view, and the axial groove portions include first axial groove portions and second axial groove portions having different degree of curvature from the first axial groove portions.

In another aspect of the invention, it is preferred that each of the first axial groove portions is adjacent to one of the second axial groove portions in the tire circumferential direction.

In another aspect of the invention, it is preferred that the first axial groove portions or the second axial groove portions extend in an arc shape in a plan view.

In another aspect of the invention, it is preferred that the first axial groove portions or the second axial groove portions extend in a v-shape in a plan view.

In another aspect of the invention, it is preferred that the land region is divided into a plurality of block-like portions by the plurality of the axial groove portions, and a maximum ground contacting surface of the block-like portions is not more than 1.2 times a minimum ground contacting surface of the block-like portions.

In another aspect of the invention, it is preferred that the at least one land region includes a first land region and a second land region adjacent to each other, each of the first land region and the second land region is provided with a plurality of the axial groove portions, and the axial groove portions in the first land region are formed at different positions in the tire circumferential direction from the axial groove portions in the second land region.

In another aspect of the invention, it is preferred that each of the axial groove portions in the first land region is formed at a position shifted in the tire circumferential direction by a distance L1 from its adjacent one of the axial groove portions in the second land region, and the distance L1 is not less than 0.1 times a pitch in the tire circumferential direction of the first axial groove portions.

In another aspect of the invention, it is preferred that the degree of curvature of each of the axial groove portions is defined by a radius of curvature of an arc passing through three points of a middle point of an entire length of the axial groove portion, a first end portion and a second end portion each of which is a point distant on a side of the middle portion from corresponding one of ends of the axial groove portion by a distance of 25% of the entire length, and a radius of curvature R1 of each of the first axial groove portions is larger than a radius of curvature R2 of each of the second axial groove portions.

In another aspect of the invention, it is preferred that the radius of curvature R1 of each of the first axial groove portions is in a range of from 1.1 to 10 times the radius of curvature R2 of each of the second axial groove portions.

In another aspect of the invention, it is preferred that the larger a difference in the degree of curvature between each of the first axial groove portions and each of the second axial groove portions, the smaller a depth of each of the axial groove portions.

DESCRIPTION OF THE PREFERRED EMBODIMENT

An embodiment of the present invention will now be described in detail.

Figure 1:
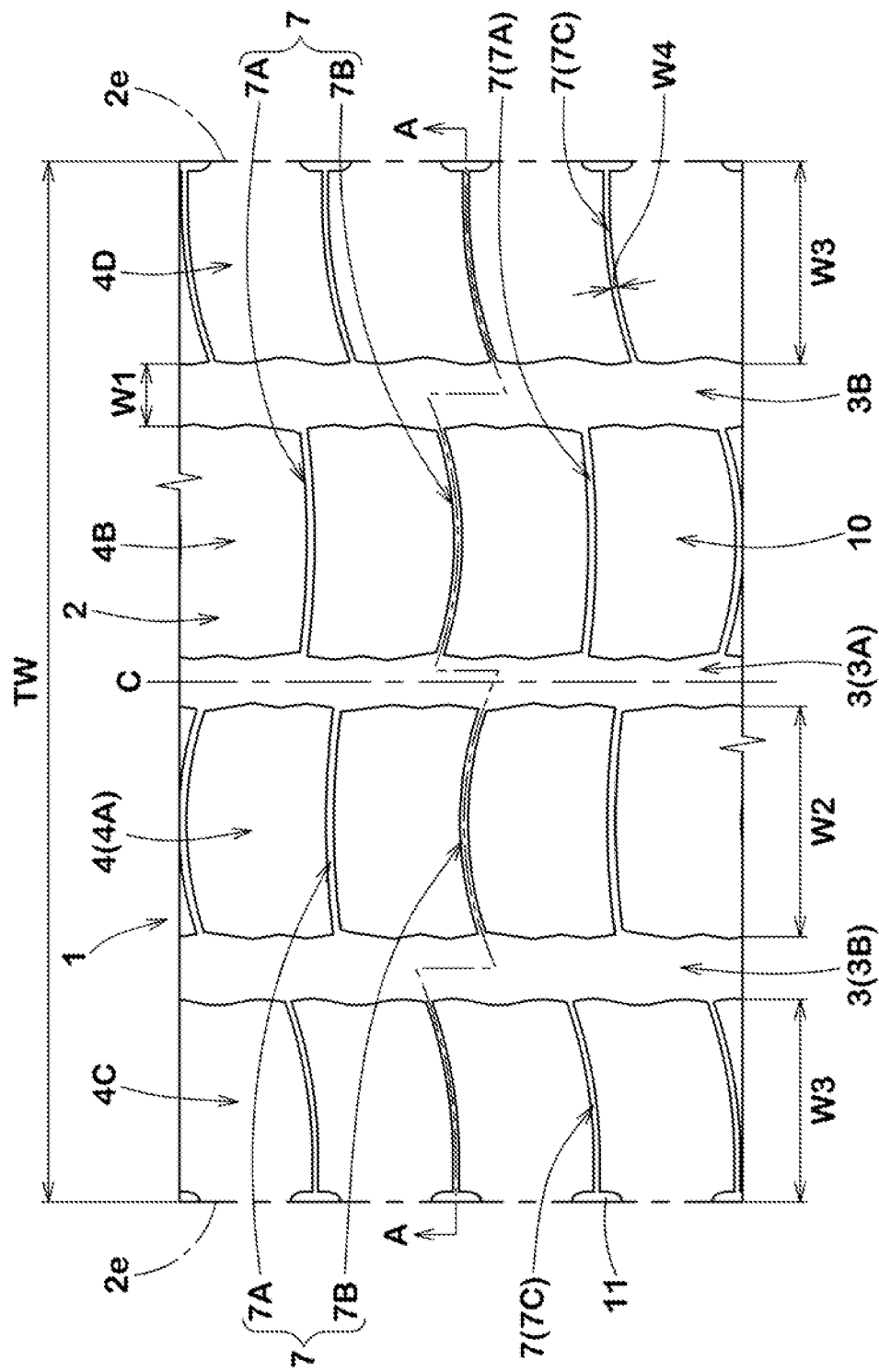
FIG. 1 is a development view of a tread portion of a tire as an embodiment of the present invention.
Figure 2:
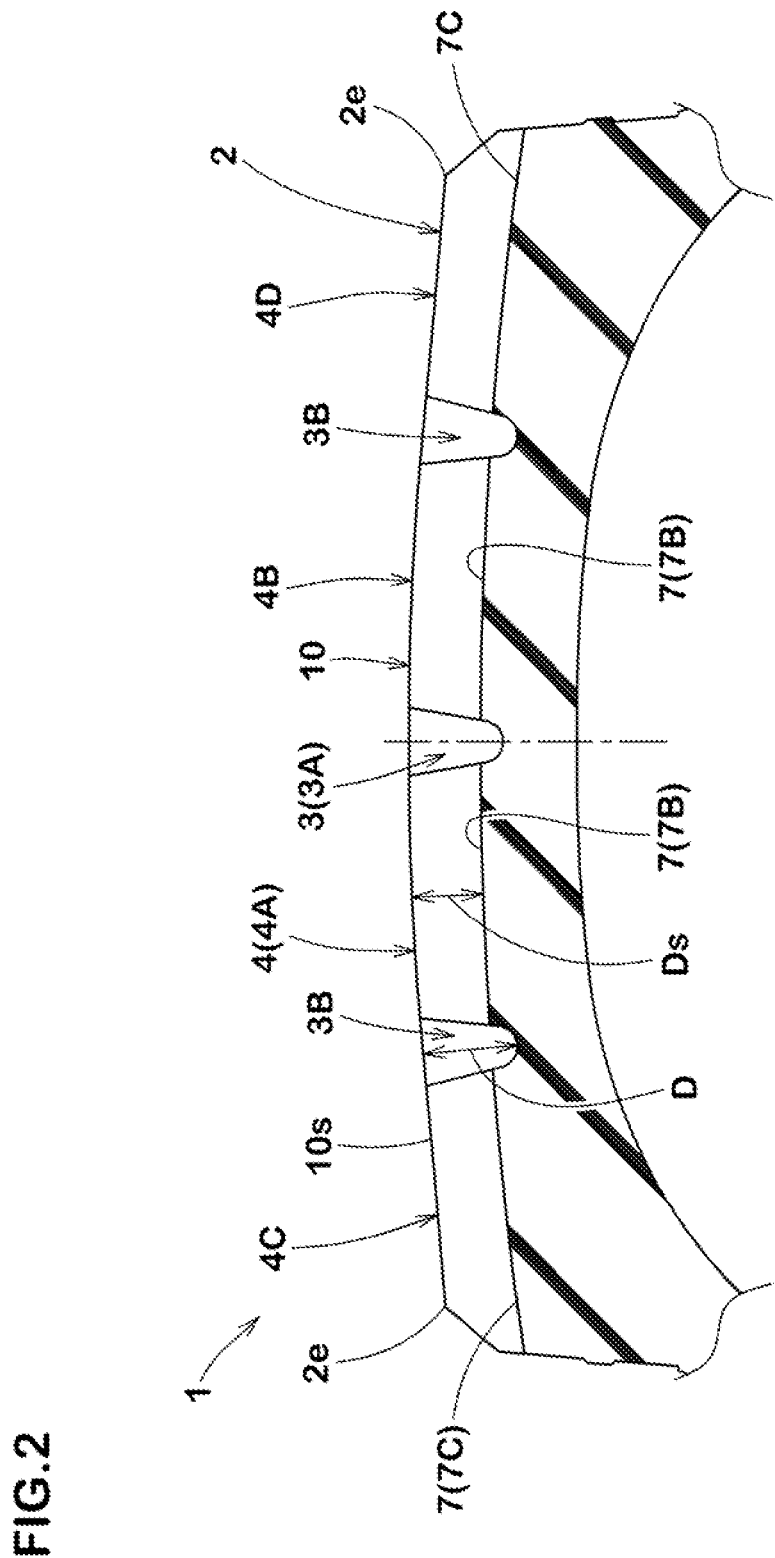
FIG. 2 is a cross-sectional view taken along A-A line of FIG. 1.

FIG. 1 is a development view of a tread portion 2 of a tire 1 in this embodiment. FIG. 2 is a cross-sectional view taken along A-A line of FIG. 1. The tire 1 in this embodiment is suitably used as a tire for heavy load for such as trucks and buses, for example.

The tread portion 2 is provided with a plurality of main grooves 3 extending continuously in a tire circumferential direction. By these main grooves 3, at least one, a plurality of in this embodiment, land region 4 extending in the tire circumferential direction is formed in the tread portion 2.

The main grooves 3 in this embodiment include a center main groove 3A and shoulder main grooves 3B.

The center main groove 3A in this embodiment extends on a tire equator C along the tire circumferential direction. Note that the center main groove 3A may be provided one by one on each side of the tire equator C, for example.

Further, the center main groove 3A may be configured to extend in a straight, wavy, or zigzag manner in the tire circumferential direction, for example.

The shoulder main grooves 3B extends continuously along the tire circumferential direction each between the center main groove 3A and corresponding one of tread ground contact edges 2e. Note that, like the center main groove 3A, the shoulder main grooves 3B may extend in a straight, wavy, or zigzag manner in the tire circumferential direction, for example.

The "tread ground contact edges 2e" are defined as edges when they can be clearly identified as the edges by their appearance. Note that when the edges cannot be clearly identified by their appearance, they are defined as outermost ground contacting positions of the tread portion 2 in a tire axial direction when the tire 1 in a standard state is in contact with a flat surface with zero camber angles by being loaded with a standard tire load. The standard state is a state in which the tire 1 is mounted on a standard rim (not shown), inflated to a standard pressure, and loaded with no tire load. In this specification, unless otherwise noted, dimensions and the like of various parts of the tire 1 are values measured in the standard state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

A width W1 in the tire axial direction and a depth D (shown in FIG. 2) of each of the center main groove 3A and the shoulder main grooves 3B can be appropriately determined. It is preferred that the width W1 of each of the center main groove 3A and the shoulder main grooves 3B is in about a range of from 4.0% to 7.0% of a tread width TW, for example. The tread width TW is a distance in the tire axial direction between the tread ground contact edges 2e. It is preferred that the depth D of each of the center main groove 3A and the shoulder main grooves 3B is in about a range of from 10 to 25 mm in a case when the tire 1 is used as a tire for heavy load.

The land regions 4 include a first land region 4A and a second land region 4B adjacent to each other. Further, the land regions 4 in this embodiment include a third land region 4C and a fourth land region 4D. Each of the land regions 4A to 4D is provided with a plurality of axial groove portions 7 that are curved so as to protrude in one direction in the tire circumferential direction in a plan view. Thereby, each of the land regions 4A to 4D is divided into a plurality of block-like portions 10 by the plurality of the axial groove portions 7.

The first land region 4A and the second land region 4B in this embodiment are respectively defined between the center main groove 3A and corresponding one of the shoulder main grooves 3B. The first land region 4A is arranged on one side in the tire axial direction with respect to the center main groove 3A. The second land region 4B is arranged on the other side in the tire axial direction with respect to the center main groove 3A. Therefore, the first land region 4A and the second land region 4B are adjacent to each other with the center main groove 3A therebetween. A width W2 of each of the first land region 4A and the second land region 4B can be appropriately determined. It is preferred that the width W2 in this embodiment is in about a range of from 20% to 24% of the tread width TW.

The third land region 4C and the fourth land region 4D are respectively defined between corresponding one of the shoulder main grooves 3B and its adjacent one of the tread ground contact edges 2e. The third land region 4C is adjacent to the first land region 4A with the shoulder main groove 3B therebetween. The fourth land region 4D is adjacent to the second land region 4B with the shoulder main groove 3B therebetween. A width W3 of each of the third land region 4C and the fourth land region 4D can be appropriately determined. It is preferred that the width W3 in this embodiment is in about a range of from 18% to 22% of the tread width TW.

Each of the axial groove portions 7 in this embodiment is configured as a sipe having a width W4 less than 1.5 mm. The axial groove portions 7 configured as such provide edges in the tire axial direction, therefore, it is possible to improve traction performance and wet performance.

By the axial groove portions 7 configured as sipes, each of the land regions 4 is formed as a rib extending substantially continuously in the tire circumferential direction. Here, the rib extending "continuously" means that the rib is not divided in the tire circumferential direction by a lateral groove (not shown) or the like having a width not less than 1.5 mm. The land regions 4 configured as such can improve rigidity thereof in the tire circumferential direction and in the tire axial direction compared with a block row divided by lateral grooves or the like, for example. Thereby, the tire 1 can improve running performance on a dry road surface.

Further, each of the axial groove portions 7 may be configured as a lateral groove including a part having the width W4 not less than 1.5 mm. The axial groove portions 7 configured as such can effectively drain water film on a road surface while providing edges.

Both ends of each of the axial groove portions 7 in this embodiment are connected with one of the main grooves 3 or one of the tread ground contact edges 2e, but they are not limited to such a configuration. One end or both ends of each of the axial groove portions 7 may be configured to terminate within the land region 4 without being connected with one of the main groove 3 or one of the tread ground contact edges 2e, for example. The axial groove portions 7 configured as such can effectively improve the rigidity of the land regions 4.

Each of the axial groove portions 7 in this embodiment extends in an arc shape in a plan view. The axial groove portions 7 configured as such can provide edges in the tire axial direction and in the tire circumferential direction, therefore, it is possible to effectively improve the traction performance. Further, the axial groove portions 7 disperse stress applied to edge portions thereof, therefore, it is possible to suppress uneven wear of the land regions 4 starting from the edge portions.

Figure 3:
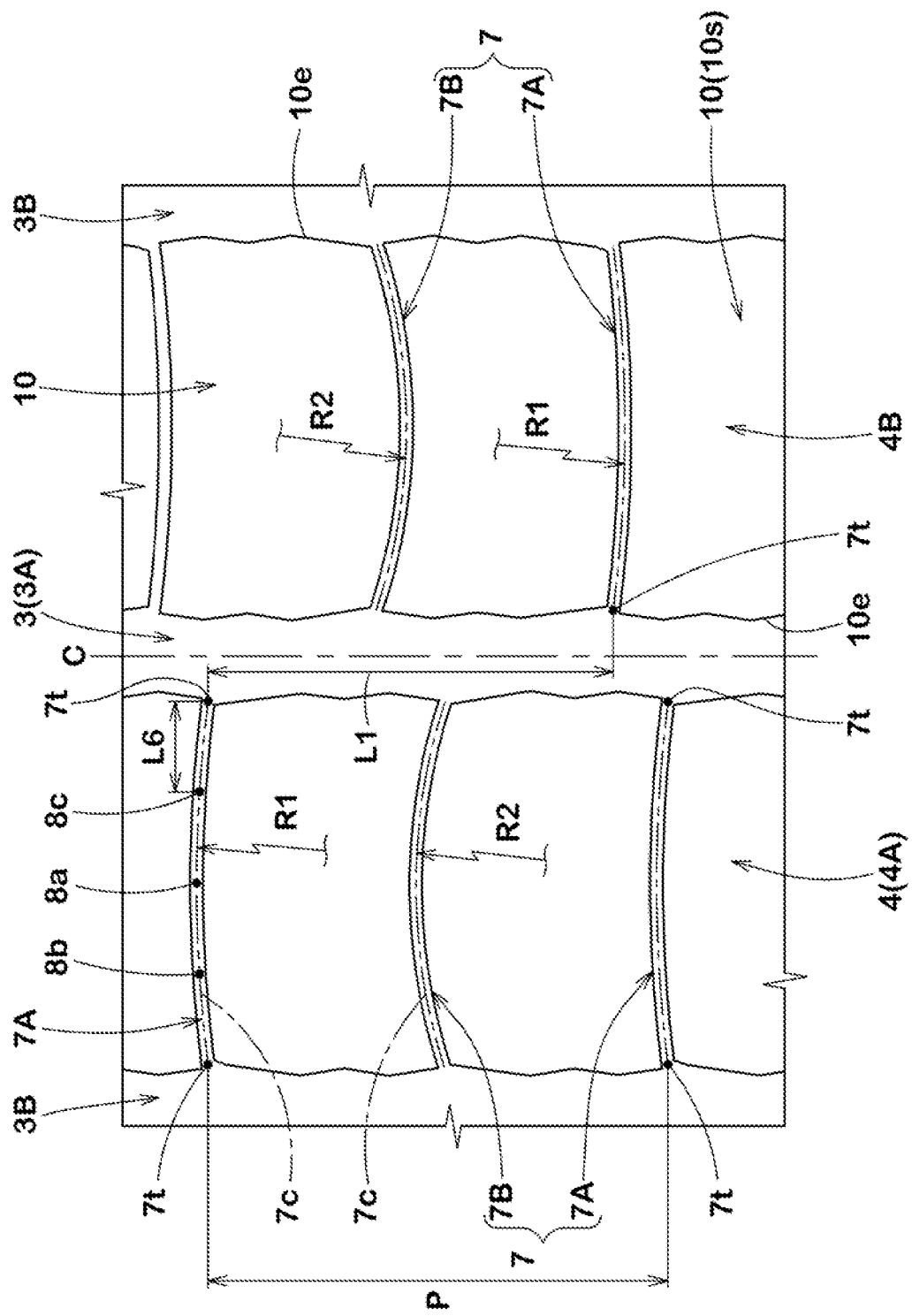
FIG. 3 is an enlarged view of a first land region and a second land region of FIG. 1.

FIG. 3 is an enlarged view of the first land region 4A and the second land region 4B of FIG. 1. Each of the axial groove portions 7 in this embodiment is formed in an arc shape in an entire length thereof in a plan view. Note that the axial groove portions 7 are not limited to those formed in an arc shape in the entire lengths thereof. A part in the entire length of at least one of the axial groove portions 7 may be formed in a straight or wavy shape, for example. Note that the entire length of each of the axial groove portions 7 is defined as a distance between both ends 7t of the axial groove portions 7. The ends 7t are each defined as a connection between a groove center line 7c of the axial groove portion 7 and one of the main grooves 3 (the center main groove 3A or one of the shoulder main grooves 3B).

As shown in FIG. 1, it is preferred that a protruding direction of the axial groove portions 7 in the first land region 4A and a protruding direction of the axial groove portions 7 in the second land region 4B are set in opposite directions in the tire circumferential direction. Further, it is preferred that the protrusion direction of the axial groove portions 7 in the first land region 4A and a protrusion direction of the axial groove portions 7 in the third land region 4C are set in opposite directions in the tire circumferential direction. Furthermore, it is preferred that the protruding direction of the axial groove portions 7 in the second land region 4B and a protruding direction of the axial groove portions 7 in the fourth land region 4D are set in opposite directions in the tire circumferential direction. Thereby, each of the axial groove portions 7 in the first land region 4A to the fourth land region 4D can provide edges regardless of a rotational direction of the tire, therefore, it is possible that the traction performance and the wet performance are improved.

The axial groove portions 7 in this embodiment include first axial groove portions 7A and second axial groove portions 7B having different degree of curvature from the first axial groove portions 7A. The first axial groove portions 7A and the second axial groove portions 7B are provided in the first land region 4A and the second land region 4B, respectively. The first axial groove portions 7A and the second axial groove portions 7B in this embodiment are arranged alternately in the tire circumferential direction in each of the first land region 4A and the second land region 4B.

In this specification, as shown in FIG. 3, the "degree of curvature" of each of the axial groove portions 7 is defined by a radius of curvature of an arc passing through three points of a middle portion 8a of the entire length of the axial groove portion 7, a first end portion 8b and a second end portion 8c each of which is a point distant on a side of the middle portion 8a from corresponding one of the ends 7t by a distance L6 which is 25% of the entire length of the axial groove portion 7. Note that the middle portion 8a, the first end portion 8b and the second end portion 8c are to be specified on the groove center line 7c of the axial groove portion 7.

In this embodiment, a radius of curvature R1 of each of the first axial groove portions 7A is larger than a radius of curvature R2 of each of the second axial groove portions 7B. The first axial groove portions 7A and the second axial groove portions 7B configured as such can provide different edges, therefore, it is possible that the traction performance and the wet performance are effectively improved. Note that each of the radius of curvature R1 of the first axial groove portion 7A and the radius of curvature R2 of the second axial groove portion 7B is defined as a radius of curvature of an arc passing through three points of the middle portion 8a, the first end portion 8b, and the second end portion 8c.

The first axial groove portions 7A and the second axial groove portions 7B have different degree of curvature from each other, therefore, it is possible that pitch sounds of different frequency bands are generated. Thereby, the tire 1 can disperse the frequency bands of the pitch sound over a wide range, therefore, it is possible that the noise performance is improved.

In order to effectively exert the above effects, it is preferred that the first and the second axial groove portions 7A and 7B are adjacent to each other in the tire circumferential direction, in other words it is preferred that the first and the second axial groove portions 7A and 7B are arranged alternately in the tire circumferential direction. Thereby, the pitch sound of different frequency bands are alternately generated, therefore, it is possible that the overlap of the pitch sound is effectively prevented.

Further, it is preferred that the radius of curvature R1 of each of the first axial groove portions 7A is in a range of from 1.1 to 10 times the radius of curvature R2 of each of the second axial groove portions 7B. Note that when the radius of curvature R1 of each of the first axial groove portions 7A is less than 1.1 times the radius of curvature R2 of each of the second axial groove portions 7B, the frequency bands cannot be dispersed over a wide range, therefore, it is possible that the noise performance cannot be improved sufficiently. On the contrary, when the radius of curvature R1 of each of the first axial groove portions 7A is more than 10 times the radius of curvature R2 of each of the second axial groove portions 7B, rigidity of the block-like portions 10 adjacent to each other with one of the first axial groove portions 7A or one of the second axial groove portions 7B becomes non-uniform, therefore, it is possible that the uneven wear occurs. From this point of view, the radius of curvature R1 of each of the first axial groove portions 7A is preferably not less than twice, and preferably not more than eight times, the radius of curvature R2 of each of the second axial groove portions 7B.

With regard to the radius of curvature R1 of each of the first axial groove portions 7A and the radius of curvature R2 of each of the second axial groove portions 7B, it is possible that they can be suitably determined as long as the radius of curvature R1 of each of the first axial groove portions 7A is larger than the radius of curvature R2 of each of the second axial groove portions 7B. Note that if the radius of curvature R1 of each of the first axial groove portions 7A and the radius of curvature R2 of each of the second axial groove portions 7B are small, the uneven wear starting from the first axial groove portions 7A and the second axial groove portions 7B is likely to occur. On the contrary, if the radius of curvature R1 of each of the first axial groove portions 7A and the radius of curvature R2 of each of the second axial groove portions 7B are large, it is possible that the wet performance is deteriorated. From this point of view, it is preferred that the radius of curvature R1 of each of the first axial groove portions 7A is in a range of from 60 to 200 mm, and it is preferred that the radius of curvature R2 of each of the second axial groove portions 7B is in a range of from 20 to 100 mm.

The larger a difference between the degree of curvature of each of the first axial groove portions 7A (radius of curvature R1) and the degree of curvature of each of the second axial groove portions 7B (radius of curvature R2), the larger a difference in the rigidity of the block-like portions 10 adjacent to each other in the tire circumferential direction with one of the first axial groove portions 7A or the second axial groove portions 7B therebetween, therefore, the uneven wear is more likely to occur. Thereby, it is preferred that the larger the difference in the degree of curvature between each of the first axial groove portions 7A and each of the second axial groove portions 7B, the smaller a depth (not shown) of each of the axial groove portions 7. Thereby, it is possible that the difference in the rigidity of the block-like portions 10 is made small, therefore, it is possible that the uneven wear is prevented from occurring.

In order to effectively exert the above effects, it is preferred that a ratio (Ds/D) of a depth Ds (shown in FIG. 2) of each of the axial groove portions 7 and the depth D (shown in FIG. 2) of each of the main grooves 3 satisfies the following expression (1). Thereby, the larger the difference in the degree of curvature between each of the first axial groove portions 7A and each of the second axial groove portions 7B, the smaller the depth Ds of each of the axial groove portions 7 can be made with respect to the depth D of each of the main grooves 3. Therefore, it is possible that the difference in the rigidity of the block-like portions 10 is made small.

$$Ds/D < (R2 + R1 \times 2)/(R1 \times 3) \tag{1}$$

Further, it is preferred that the axial groove portions 7 formed in the first land region 4A are formed at different positions in the tire circumferential direction with respect to the axial groove portions 7 formed in the second land region 4B. Therefore, in the tire 1, the timing of generating the pitch sound can be shifted between the first land region 4A and the second land region 4B, thereby, it is possible that the overlap of the pitch sound is effectively prevented.

Each of the axial groove portions 7 formed in the first land region 4A in this embodiment is formed at a different position in the tire circumferential direction at a distance L1 with respect to its adjacent one of the axial groove portions 7 formed in the second land region 4B. In this embodiment, the distance L1 is defined based on one of the ends 7t of the first axial groove portions 7A of the first land region 4A and its adjacent one of the ends 7t of the first axial groove portions 7A of the second land region 4B. Further, the distance L1 is defined as a distance in a direction in which the protruding direction of the first axial groove portions 7A of the first land region 4A and the protruding direction of the first axial groove portions 7A of the second land region 4B are separated.

Note that if the distance L1 is smaller than a pitch P in the tire circumferential direction of the first axial groove portions 7A, the timing of generating the pitch sound cannot be sufficiently shifted. On the contrary, if the distance L1 is larger than the pitch P, it is possible that that the distance L1 in the tire circumferential direction between the other one of the adjacent axial groove portions 7 becomes small. From this point of view, the distance L1 is preferably not less than 0.1 times the pitch P, and preferably not more than 0.9 times the pitch P. Note that the pitch P in the tire circumferential direction of the first axial groove portions 7A is defined based on the ends 7t of the axial groove portions 7. It should be noted that it is preferred that a distance between each of the second axial groove portions 7B of the first land region 4A and its adjacent one of the second axial groove portions 7B of the second land region 4B is also set within the same range.

As shown in FIG. 1, the axial groove portions 7 in this embodiment include third axial groove portions 7c having different degree of curvature from the first axial groove portions 7A and the second axial groove portions 7B. The third axial groove portions 7C in this embodiment are provided in each of the third land region 4c and the fourth land region 4D, and they are spaced apart from each other in the tire circumferential direction. The third axial groove portions 7c configured as such can provide edges different from those of the first axial groove portions 7A and the second axial groove portions 7B, therefore, it is possible that the traction performance and the wet performance are effectively improved.

Figure 4:
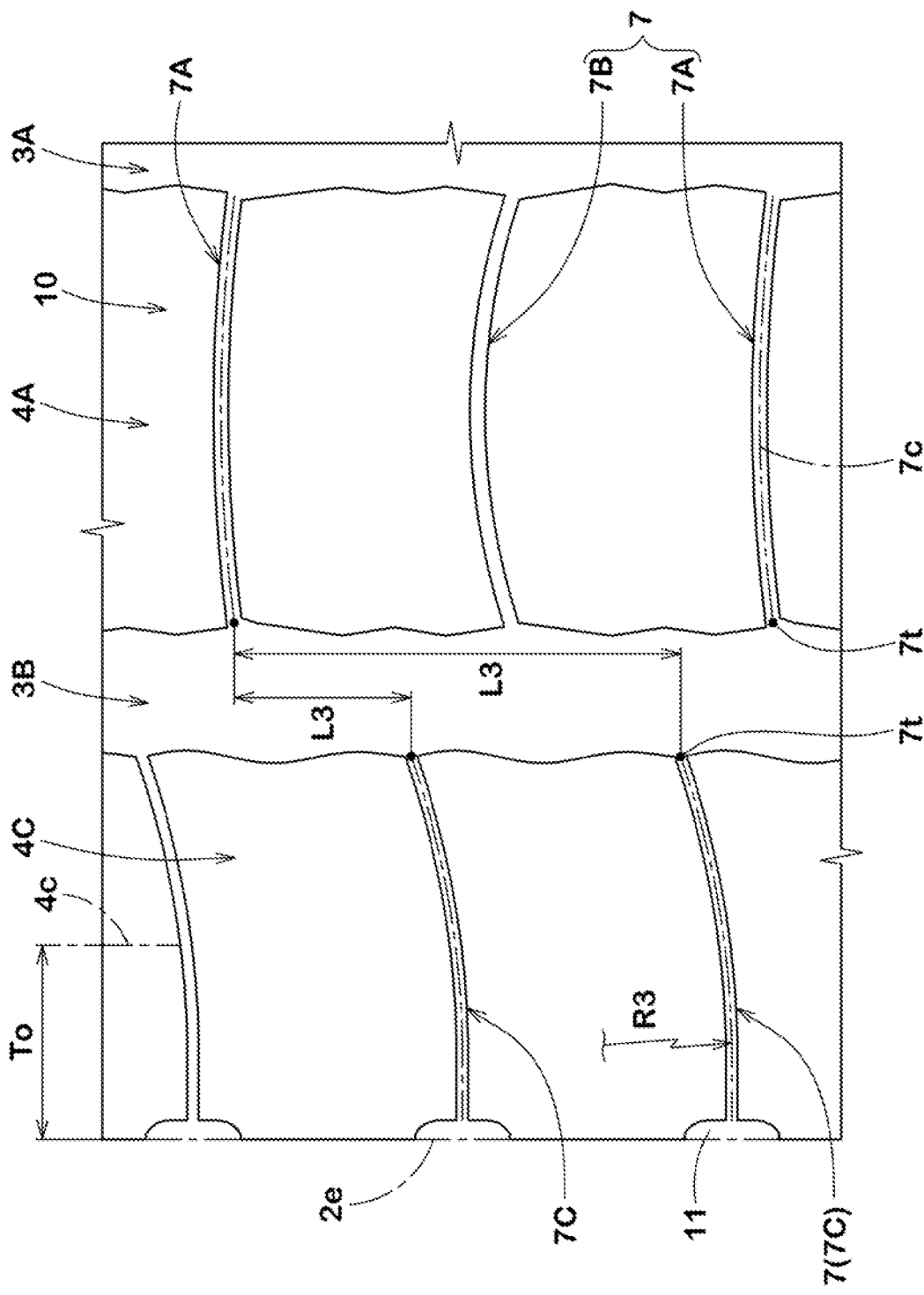
FIG. 4 is an enlarged view of the first land region and a third land region of FIG. 1.
Figure 5:
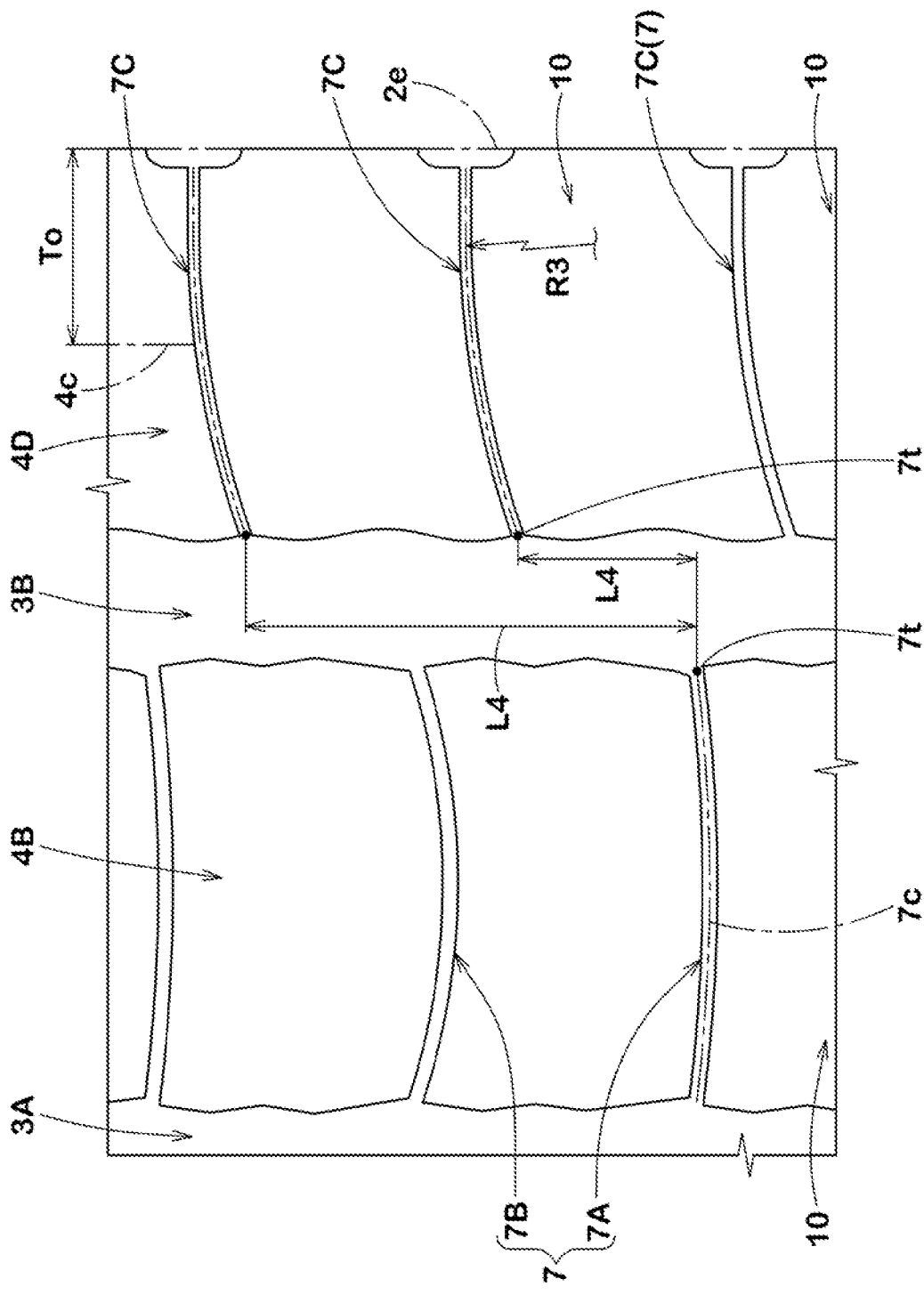
FIG. 5 is an enlarged view of the second land region and a fourth land region of FIG. 1.

FIG. 4 is an enlarged view of the first land region 4A and the third land region 4C of FIG. 1. FIG. 5 is an enlarged view of the second land region 4B and the fourth land region 4D of FIG. 1. In each of the third land region 4C and the fourth land region 4D, each of the third axial groove portions 7C in this embodiment is formed in an arc shape having a center thereof in an outer region To.

In each of the third land region 4C and the fourth land region 4D, the "outer region To" is a region on an outer side in the tire axial direction of a center position 4c in a width direction of the land region. The third axial groove portions 7C configured as such can effectively provide edges during cornering when ground contact pressure becomes relatively large in the outer regions To of the third land region 4C and the fourth land region 4D, therefore, it is possible that cornering performance and the wet performance are improved.

A radius of curvature R3 of each of the third axial groove portions 7C can be suitably determined. From the same point of view as the radius of curvature R1 of each of the first axial groove portions 7A and the radius of curvature R2 of each of the second axial groove portions 7B shown in FIG. 3, it is preferred that the radius of curvature R3 of each of the third axial groove portions 7C is in a range of from 40 to 200 mm.

An outer end in the tire axial direction of each of the third axial groove portions 7C is connected with one of recess portions 11 provided in the tread ground contact edges 2e. Thereby, the third axial groove portions 7C can effectively drain a water film on a road surface from the recess portions 11, therefore, it is possible that the wet performance is improved.

As shown in FIG. 4, it is preferred that each of the third axial groove portions 7C in the third land region 4C are formed at a position shifted in the tire circumferential direction by a distance L3 from its adjacent one of the axial groove portions 7 in the first land region 4A (the first axial groove portions 7A in this embodiment). The distance L3 is defined based on the ends 7t of the third axial groove portions 7C of the third land region 4C and the ends 7t of the first axial groove portions 7A of the first land region 4A. Further, the distance L3 is defined as a distance in a direction in which the protruding direction of the third axial groove portions 7C of the third land region 4C and the protruding direction of the first axial groove portions 7A of the first land region 4A are separated. Furthermore, two third axial groove portions 7c are formed in the third land region 4C between a pair of the first axial groove portions 7A adjacent to each other in the tire circumferential direction. Therefore, the distance L3 is defined as two kinds, i.e. large one and small one. Thereby, in the tire 1, the timing of generating the pitch sound can be shifted between the third land region 4c and the first land region 4A, therefore, it is possible that the overlap of the pitch sound is effectively prevented. In order to effectively exert such effects, it is preferred that the small one of the two distances L3 is in a range of from 0.1 to 0.4 times the pitch P in the tire circumferential direction of the first axial groove portions 7A, and it is preferred that the large one of the two distances L3 is in a range of from 0.6 to 0.9 times the pitch P.

As shown in FIG. 5, like the third axial groove portions 7C (shown in FIG. 4) of the third land region 4c shown in FIG. 4, it is preferred that each of the third axial groove portions 7C in the fourth land region 4D are formed at a position shifted in the tire circumferential direction by a distance L4 from its adjacent one of the axial groove portions 7 in the second land region 4B (the first axial groove portions 7A in this embodiment). The distance L4 is defined based on the ends 7t of the third axial groove portions 7C in the fourth land region 4D and the ends 7t of the first axial groove portions 7A in the second land region 4B. Further, similarly to the distances L3 (shown in FIG. 4), the distance L4 is defined as two kinds, i.e. large one and small one, and it is preferred that the small one of the two distances L4 is in a range of from 0.1 to 0.4 times the pitch P in the tire circumferential direction of the first axial groove portions 7A, and it is preferred that the large one of the two distances L4 is in a range of from 0.6 to 0.9 times the pitch P.

Figure 6:
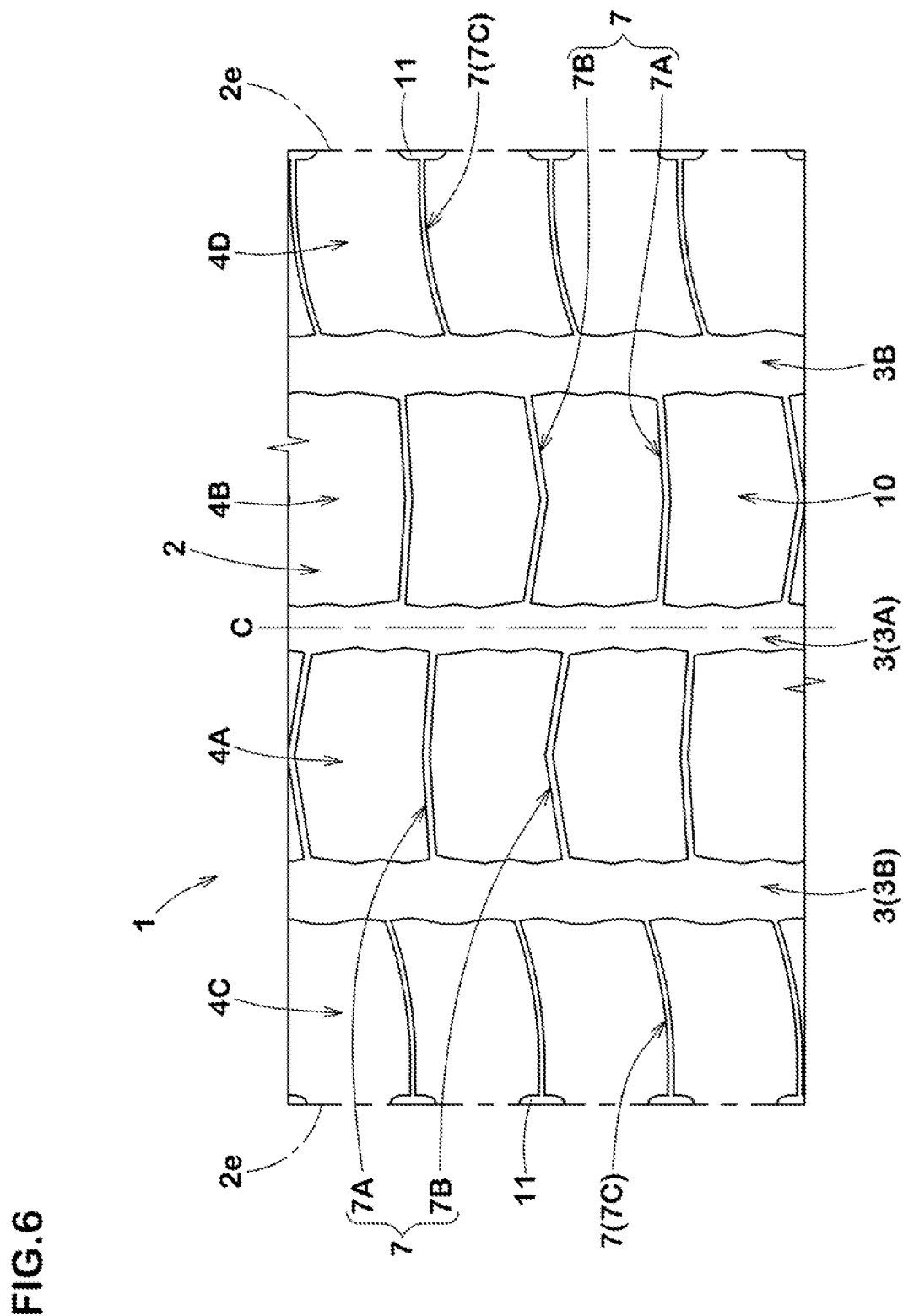
FIG. 6 is a development view of the tread portion of the tire according to a first modification of the embodiment of the present invention.

As shown in FIG. 1, the first axial groove portions 7A and the second axial groove portions 7B in this embodiment extending in an arc shape has been illustrated as examples, but the present invention is not limited to such a configuration. FIG. 6 is a development view of the tread portion 2 of the tire 1 according to a first modification of the above illustrated embodiment of the present invention. In the explanation of this modification, the same components as those of the above embodiment are denoted by the same reference numerals, and the description thereof may be omitted.

As shown in FIG. 6, each of the first axial groove portions 7A and the second axial groove portions 7B may be configured to extend in a v-shape in a plan view. Note that the degree of bending of each of the v-shaped axial groove portions 7 is defined in the same way as the degree of curvature of each of the arc-shaped axial groove portions 7 being defined by the radius of curvature of the arc passing through three points including the first end portion 8b and the second end portion 8c shown in FIG. 3.

As compared with the arc-shaped axial groove portions 7, the V-shaped axial groove portions 7 configured as such are easily processed by knife blades, and further, it is possible that design variations are easily widened. Furthermore, the third axial groove portions 7c may also be configured to extend in a V-shape.

Figure 7A:
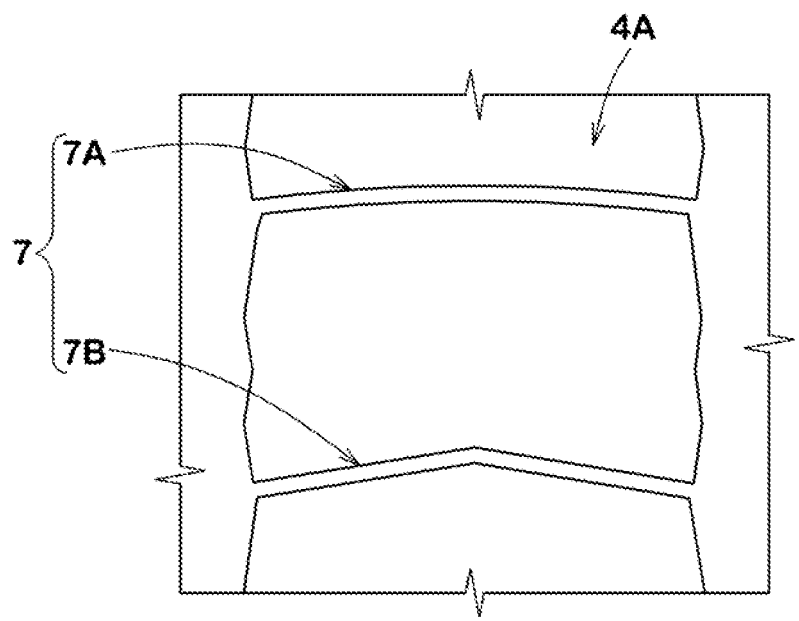
FIG. 7A is a part of a development view of the tread portion of the tire according to a second modification of the embodiment of the present invention.
Figure 7B:
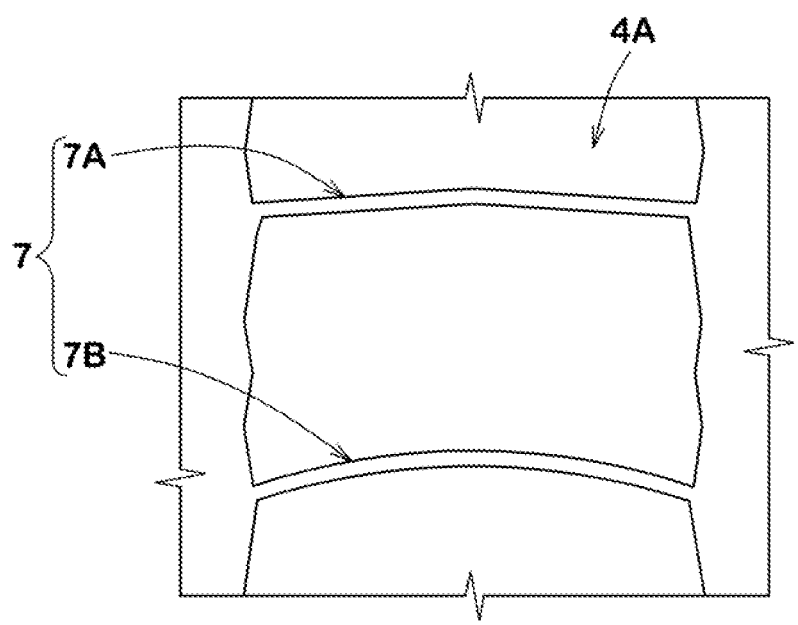
FIG. 7B is a part of a development view of the tread portion of the tire according to a third modification of the embodiment of the present invention.

FIGS. 7A and 7B are parts of development views of the tread portions of the tire according to a second and a third modifications of the above-illustrated embodiment of the present invention, respectively. In the explanations of these modifications, the same components as those of the above embodiment are denoted by the same reference numerals, and the description thereof may be omitted.

In the second modification shown in FIG. 7A, the first axial groove portions 7A may extend in an arc shape and the second axial groove portions 7B may extend in a v-shape in a plan view. Further, in the third modification shown in FIG. 7B, the first axial groove portions 7A may extend in a v-shape and the second axial groove portions 7B may extend in an arc shape in a plan view. Thereby, in these modifications, it is possible that the first axial groove portions 7A or the second axial groove portions 7B extending in an arc shape and the first axial groove portions 7A or the second axial groove portions 7B extending in a v-shape are arranged in a mixed manner, therefore, it is possible that the traction performance and the wet performance are improved while effectively preventing the overlap of the pitch sounds.

As shown in FIG. 1, each of the block-like portions 10 is formed in a laterally elongated rectangular shape in a plan view. The block-like portions 10 configured as such can increase the rigidity in the tire axial direction, therefore, it is possible that steering stability is improved. As shown in FIG. 3, each of block edges 10e on a side of one of the main grooves 3 of the block-like portions 10 is formed in a zigzag shape in a plan view. The block edges 10e configured as such can effectively provide edges, therefore, it is possible that the traction performance and the cornering performance are improved.

It is preferred that a maximum one of ground contacting surfaces 10s of the block-like portions 10 is not more than 1.2 times a minimum one of the ground contacting surfaces 10s of the block-like portions 10. Thereby, the rigidity of the block-like portions 10 can be made close to uniform, therefore, it is possible that the uneven wear is suppressed. From such a point of view, the maximum one of the ground contacting surfaces 10s of the block-like portions 10 is preferably not more than 1.1 times, more preferably not more than 1.05 times, further preferably 1.0 times the minimum one of the ground contacting surfaces 10s of the block-like portions 10.

While detailed description has been made of the tire as an especially preferred embodiment of the present invention, the present invention can be embodied in various forms without being limited to the illustrated embodiment.

Working Example (Example)

Tires (Examples 1 to 9 and Reference) having the basic structure shown in FIG. 1 and the axial groove portions configured as listed in Table 1 were made by way of test. The axial groove portions of the Examples 1 to 9 include the first axial groove portions and the second axial groove portions having different degree of curvature (radii of curvature) from the first axial groove portions. On the other hand, the axial groove portions of the Reference include the first axial groove portions and the second axial groove portions having the same degree of curvature. Then the performances of the tires as the Examples 1 to 9 and the Reference were evaluated. The specifications common to each of the Examples and the Reference are as follows.

Tire size: 275/70R22.5
Tire rim: 22.5×8.25
Tire inner pressure: 900 kPa
Test car: CITYBUS (loop bus)
Test tire mounting position: all wheels
Tread width TW: 242 mm
Main grooves:
width W1/Tread width TW: 5.5% to 6.8%
Depth D: 20.0 mm
Width W2 of First and Second land regions/Tread width TW: 21.9%
Width W3 of Third and Fourth land regions/Tread width TW: 19.2%
Pitch P in tire circumferential direction of First axial groove portions: 60.7 mm
Distance L1 between Axial groove portion of First land region and Axial groove portion of Second land region/Pitch P: 0.32
Distance L3 between Third axial groove portion of Third land region and First axial groove portion of First land region/Pitch P: 0.32, 0.82
Distance L4 between Third axial groove portion of Fourth land region and First axial groove portion of Second land region/Pitch P: 0.32, 0.82
Degree of curvature (Radius of curvature) R3 of Third axial groove portion: 80 mm
The test methods are as follows.

<Uneven Wear Resistance Performance>

Amount of wear at a plurality of positions of the first land region and the second land region was measured after driving the test car for 10000 km on a dry asphalt road surface, and then variation of the wear amounts was obtained. The test results are indicated by an index based on the variation of the wear amounts of the Example 1 being 100, wherein a smaller numerical value is better.

<Noise Performance>

While a driver was driving the above test car on a dry asphalt road surface at a speed of 60 km/h, the in-car noise was evaluated by the driver's feeling. The test results are indicated by an index based on the Example 1 being 100, wherein a smaller numerical value is better.

<Wet Performance>

The test car was driven on an asphalt road surface having a water film of 2 mm depth at a speed of 65 km/h and then sudden braking was performed. At this time, the time required for the test car to decelerate from 60 km/h to 20 km/h was measured. The test results are indicated by an index based on the Example 1 being 100, wherein a smaller numerical value is better.

The test results are shown in Table 1.

TABLE 1

| | Ex. 1 | Ex. 2 | Ex. 3 | Ex. 4 | Ex. 5 | Ex. 6 | Ex. 7 | Ex. 8 | Ex. 9 | Ref. |
|---|---|---|---|---|---|---|---|---|---|---|
| Degree of curvature (Radius of curvature) R1 of First axial groove portions [mm] | 100 | 100 | 150 | 100 | 60 | 100 | 200 | 50 | 150 | 80 |
| Degree of curvature (Radius of curvature) R2 of Second axial groove portions [mm] | 40 | 80 | 100 | 40 | 20 | 40 | 20 | 20 | 120 | 80 |
| Ratio R1/R2 | 2.5 | 1.3 | 1.5 | 2.5 | 3.0 | 2.5 | 10.0 | 2.5 | 1.3 | 1.0 |
| Area ratio of Maximum and Minimum ground contacting surfaces of Block-like portions | 1.0 | 1.0 | 1.0 | 1.1 | 1.0 | 1.0 | 1.3 | 1.0 | 1.0 | 1.3 |
| Depth Ds of Axial groove portion/Depth D of Main groove | 0.80 | 0.80 | 0.80 | 0.80 | 0.70 | 0.90 | 0.70 | 0.80 | 0.80 | 0.80 |
| (R2 + R1 × 2)/(R1 × 3) | 0.80 | 0.93 | 0.89 | 0.80 | 0.78 | 0.80 | 0.70 | 0.80 | 0.93 | 1.00 |
| Ds/D < (R2 + R1 × 2)/(R1 × 3) satisfied? | No | Yes | Yes | No | Yes | No | No | No | Yes | Yes |
| Uneven wear resistance performance [index] | 100 | 90 | 90 | 110 | 110 | 120 | 150 | 130 | 90 | 125 |
| Noise performance [index] | 100 | 110 | 105 | 105 | 105 | 105 | 115 | 110 | 105 | 120 |
| Wet performance [index] | 100 | 103 | 105 | 98 | 95 | 95 | 100 | 102 | 110 | 100 |

From the test results, it was confirmed that the noise performance was improved with respect to the tires as the Examples 1 to 9 as compared with the tire as the Reference. Further, in the Example 2 and the Example 3, an area ratio of the maximum and the minimum ones of the ground contacting surfaces of the block-like portions was set to be 1.0 and the ratio (Ds/D) of the depth Ds of each of the axial groove portions and the depth D of each of the main grooves was set to be smaller than the ratio (R2+R1×2)/(R1×3), therefore, it was possible that the noise performance was improved while maintaining the uneven wear resistance performance.

The invention claimed is:

1. A tire comprising a tread portion comprising a first land region and a third land region each extending in a tire circumferential direction, wherein the first land region is provided with a plurality of axial groove portions curved or bent so as to protrude in one side in the tire circumferential direction in a plan view, the axial groove portions include first axial groove portions and second axial groove portions having different degree of curvature from the first axial groove portions, each of the axial groove portions extends in a tire axial direction so as to completely cross the land region, each of the axial groove portions curved or bent so as to protrude in one side in the tire circumferential direction over an entire length thereof in a plan view, the tread portion includes a center main groove extending continuously in the tire circumferential direction on a tire equator and a shoulder main groove extending continuously in the tire circumferential direction between the first land region and the third land region arranged axially outside the first land region, the first land region is immediately adjacent to the center main groove, areas obtained by projecting the axial groove portions parallel with a tire axial direction are completely spaced apart from each other and do not overlap with each other in the tire circumferential direction, the first land region is not provided with a groove and a sipe extending in the tire circumferential direction, the first land region has a width (W2) of 20% or more and 24% or less of a tread width, the third land region has a width (W3) of 18% or more and 22% or less of the tread width, a radius of curvature R1 of each of the first axial groove portions is larger than a radius of curvature R2 of each of the second axial groove portions, and a ratio (Ds/D) of a depth Ds of each of the axial groove portions and the depth D of each of the main grooves satisfies an expression (1):

$$Ds/D < (R2+R1\times2)/(R1\times3) \qquad (1).$$

2. The tire according to claim 1, wherein each of the first axial groove portions is adjacent to one of the second axial groove portions in the tire circumferential direction.

3. The tire according to claim 1, wherein the first axial groove portions or the second axial groove portions extend in an arc shape in a plan view.

4. The tire according to claim 1, wherein the first axial groove portions or the second axial groove portions each have a center line extending in a V-shape as a whole in an entire length thereof in a plan view, and the center line is a width-wise center line of the respective axial groove portion.

5. The tire according to claim 1, wherein the axial groove portions do not overlap in the tire circumferential direction.

6. The tire according to claim 1, wherein each of the axial groove portions is formed in an arc shape protruding to one side in the tire circumferential direction in an entire length thereof in a plan view.

7. The tire according to claim 1, wherein each of widths of the axial groove portions is less than 1.5 mm.

8. The tire according to claim 1, wherein a first virtual linear line connecting both axial ends of each of the first axial groove portions and a second virtual linear line connecting both axial ends of each of the second axial groove portions are substantially parallel with a tire axial direction.

9. The tire according to claim 1, wherein
the first land region is divided into a plurality of block-like portions by the plurality of the axial groove portions, and
a maximum one of ground contacting surfaces of the block-like portions is not more than 1.2 times a minimum one of the ground contacting surfaces of the block-like portions.

10. The tire according to claim 9, wherein
the maximum one of the ground contacting surfaces of the block-like portions is 1.0 times the minimum one of the ground contacting surfaces of the block-like portions.

11. The tire according to claim 1, wherein
the degree of curvature of each of the axial groove portions is defined by a radius of curvature of an arc passing through three points of a middle point of an entire length of the axial groove portion, a first end portion and a second end portion each of which is a point distant on a side of the middle portion from corresponding one of ends of the axial groove portion by a distance of 25% of the entire length, and
the radius of curvature R1 of each of the first axial groove portions is in a range of from 60 to 200 mm, and the radius of curvature R2 of each of the second axial groove portions is in a range of from 20 to 100 mm.

12. The tire according to claim 11, wherein
the radius of curvature R1 of each of the first axial groove portions is in a range of from 1.1 to 10 times the radius of curvature R2 of each of the second axial groove portions.

13. The tire according to claim 1, wherein
the tread portion further includes a second land region adjacent to the first land region via the center main groove,
each of the first land region and the second land region is provided with a plurality of the axial groove portions, and
the axial groove portions in the first land region are formed at different positions in the tire circumferential direction from the axial groove portions in the second land region.

14. The tire according to claim 13, wherein
each of the axial groove portions in the first land region is formed at a position shifted in the tire circumferential direction by a distance L1 from its adjacent one of the axial groove portions in the second land region, and
the distance L1 is not less than 0.1 times a pitch in the tire circumferential direction of the first axial groove portions.

15. The tire according to claim 13, wherein
each of the axial groove portions in the first land region does not overlap in the tire circumferential direction with any one of the axial groove portions in the second land region.

16. The tire according to claim 13, wherein
the axial groove portions in the first land region protrude to a side in the tire circumferential direction opposite to the axial groove portions in the second land region.

17. The tire according to claim 13, wherein
in each of the first land region and the second land region, the first axial groove portions and the second axial groove portions are arranged alternately one by one in the tire circumferential direction.

18. The tire according to claim 13, wherein
the tread portion further includes a fourth land region arranged adjacent to the second land region on a side opposite to the first land region,
each of the third land region and the fourth land region is provided with a plurality of third axial groove portions having different degree of curvature from the first axial groove portions and the second axial groove portions, and
in each of the third land region and the fourth land region, the third axial groove portions are arranged at intervals in the tire circumferential direction.

19. The tire according to claim 18, wherein
each of the third axial groove portions is formed in an arc shape having a center thereof in an outer region, and
the outer region is a region on an axially outer side of a center position in a width direction of the respective land region.

20. The tire according to claim 18, wherein
the third land region includes a tread ground contacting edge and a plurality of recess portions arranged on the tread ground contacting edge, and
an axially outer end of each of the third axial groove portions is connected with a respective one of the recess portions.

* * * * *